June 29, 1965          H. D. EPSTEIN          3,192,345
PLURAL HEATER UNIT THERMALLY RESPONSIVE MOTOR PROTECTOR
Filed April 18, 1961          4 Sheets-Sheet 1
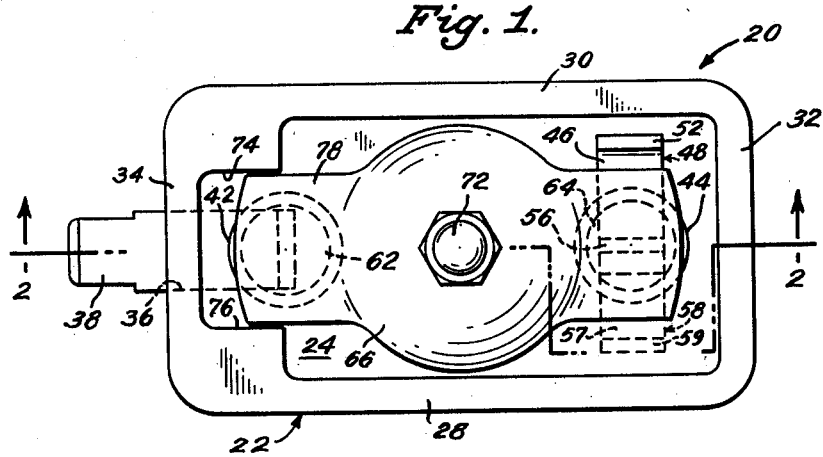
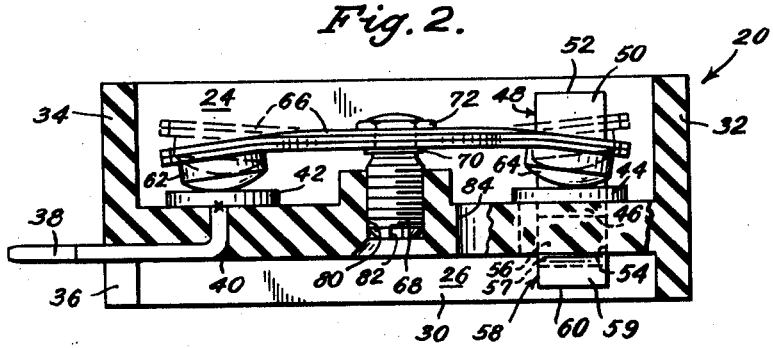
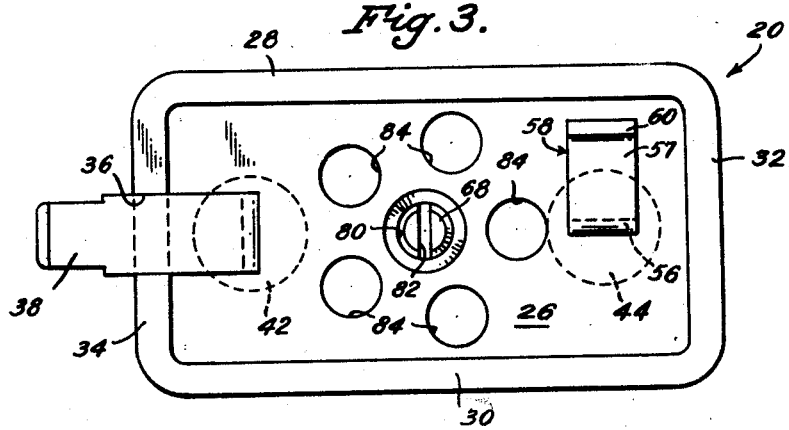
Inventor,
Henry David Epstein,
by Harold Levine Att'y.

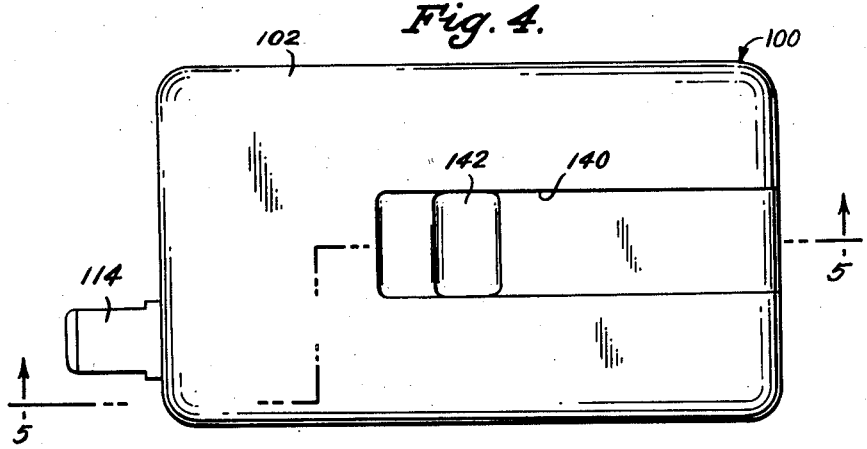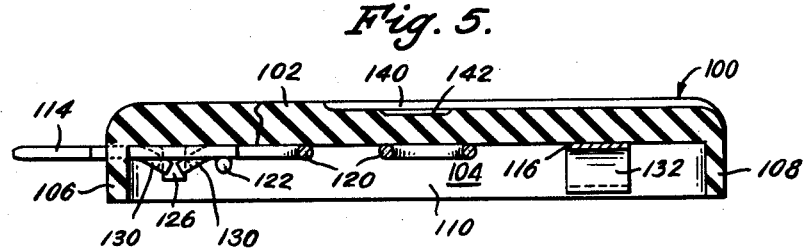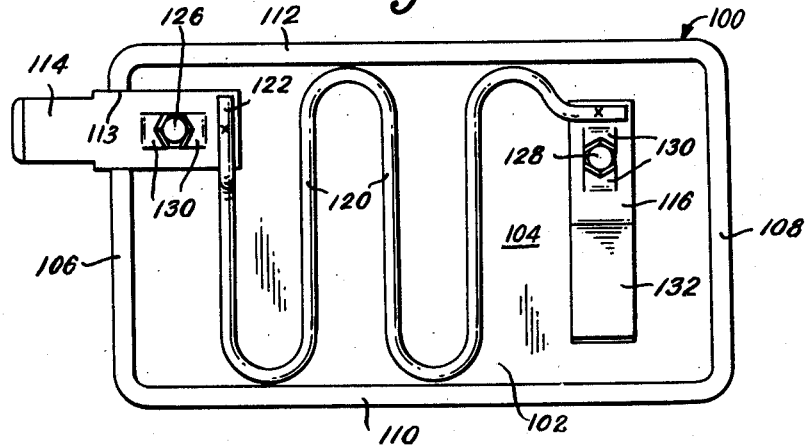

June 29, 1965  H. D. EPSTEIN  3,192,345
PLURAL HEATER UNIT THERMALLY RESPONSIVE MOTOR PROTECTOR
Filed April 18, 1961  4 Sheets-Sheet 3
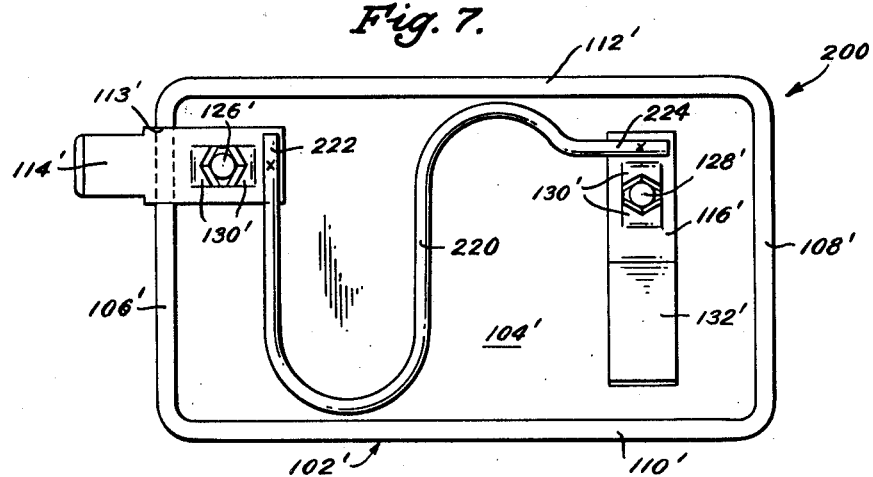
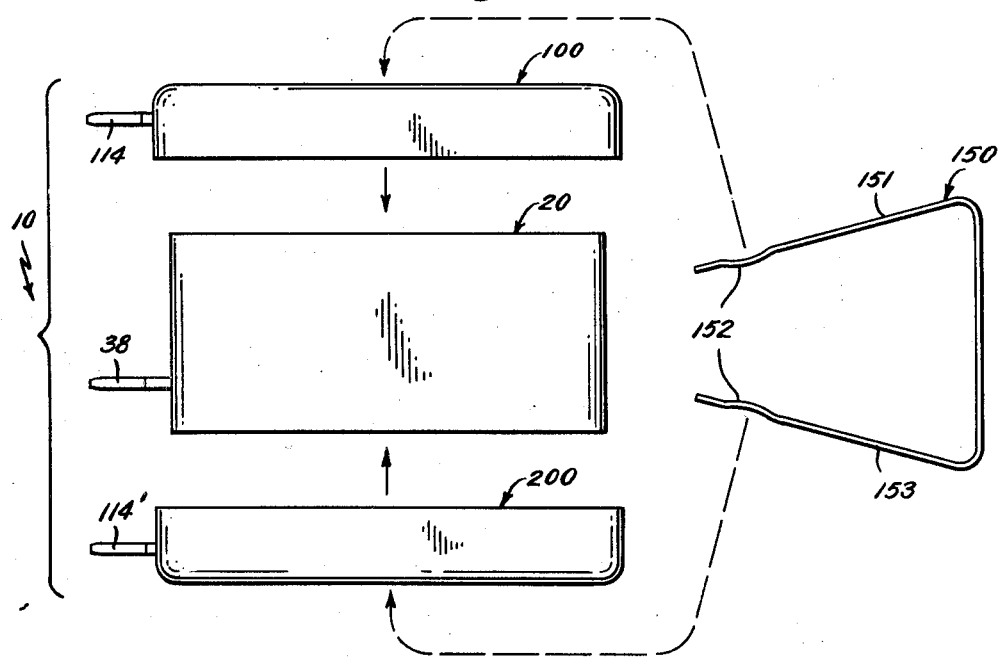
Inventor,
Henry David Epstein,
by Harold Levine
Att'y.

June 29, 1965 H. D. EPSTEIN 3,192,345
PLURAL HEATER UNIT THERMALLY RESPONSIVE MOTOR PROTECTOR
Filed April 18, 1961 4 Sheets-Sheet 4
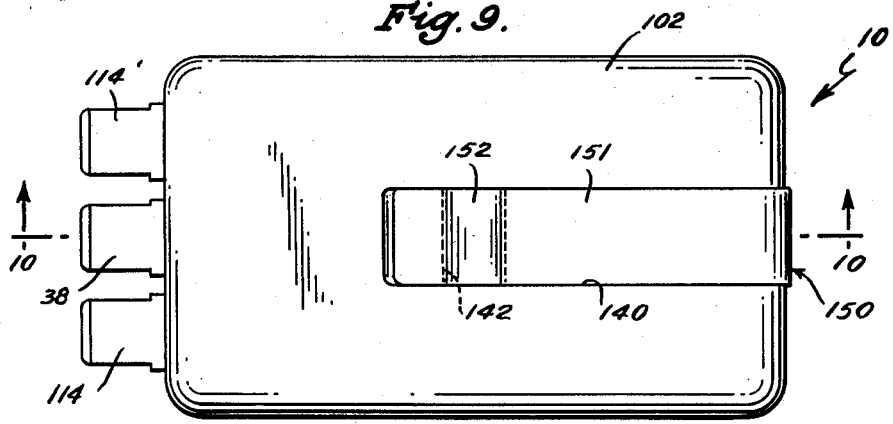
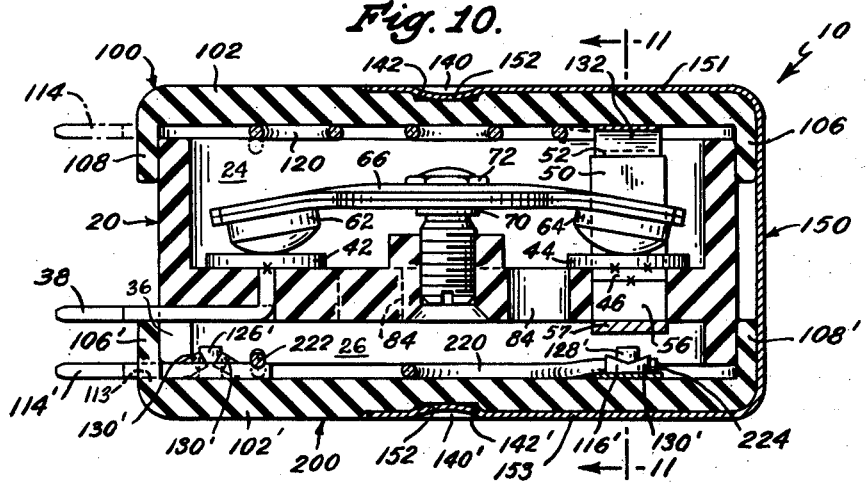
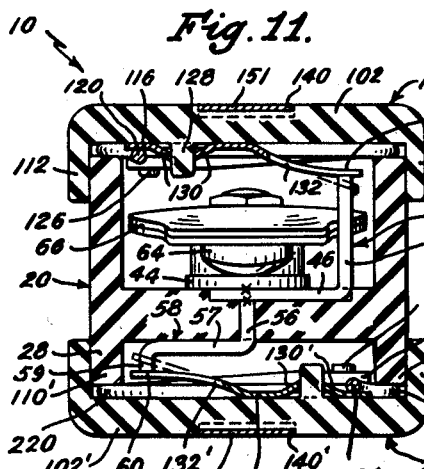
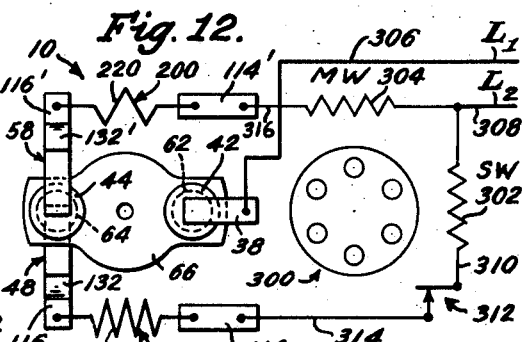
Inventor,
Henry David Epstein,
by Harold Levine
Att'y.

United States Patent Office
3,192,345
Patented June 29, 1965

1

3,192,345
PLURAL HEATER UNIT THERMALLY RESPONSIVE MOTOR PROTECTOR
Henry David Epstein, Cambridge, Mass., assignor to Texas Instruments Incorporated, Dallas, Tex., a corporation of Delaware
Filed Apr. 18, 1961, Ser. No. 103,945
3 Claims. (Cl. 200—122)

This invention relates to thermally responsive electrical switches, and with regard to certain more specific features, to thermostatic switches for protection of electrical energy-translating devices. The thermostatic switches of the instant invention are especially adapted for (though not limited to) protection of electrical motors, and are small enough to be mounted on the motor and thin enough to be embedded in one of or between the windings of the motor so as to be subject to both the heat of the motor and the current actuating the motor, to thereby provide so-called inherent overheat protection.

This invention is particularly concerned with providing improved thermostatic switches and parts therefor, which are particularly useful for repair shop installation on motors, wherein the repair shop may assemble the protector to provide the required rating for a particular motor.

It is one object of this invention to provide improved thermally responsive switches which can be quickly, accurately and easily assembled by a service repair shop, to provide a thermostatic switch having required ratings for protection of a given motor.

It is another object of the invention to provide a thermally responsive protective switch which can provide for total protection of a motor or energy-translating device.

It is another object of the instant invention to provide a thermally responsive switch, which comprises a plurality of assemblies, the respective parts of which can be easily selected and quickly assembled, for example, by a repair shop to provide a thermostatic switch having the required ratings and characteristics for protection of a given motor.

Among the further objects of the invention may be noted the provisions of a novel thermostatic electrical switch which switch is low-cost, small, compact, simple and economical in construction, simple and economical to manufacture and assemble, and which is effective and dependable in operation.

Other objects will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which one of the various possible embodiments of the invention is illustrated:

FIG. 1 is a top plan view of a base assembly unit forming a subassembly unit of a thermostatic switch according to this invention;

FIG. 2 is a view taken on line 2—2 of FIG. 1;

FIG. 3 is a bottom view of the base assembly unit shown in FIG. 1;

FIG. 4 is a plan view of a heater assembly unit forming another subassembly unit of a thermostatic switch according to this invention;

FIG. 5 is a sectional view taken on line 5—5 of FIG. 4;

FIG. 6 is a bottom view of the heater assembly unit shown in FIG. 4;

2

FIG. 7 is a plan view of a second heater assembly, similar to that of FIG. 6, employed with the switch of this invention;

FIG. 8 is an exploded elevational view of the base assembly and heater assembly units forming the switch of the instant invention;

FIG. 9 is a plan view of the thermostatic switch of this invention, in an assembled condition;

FIG. 10 is a sectional view of the assembled switch taken on line 10—10 of FIG. 9;

FIG. 11 is a sectional view taken on line 11—11 of FIG. 10; and

FIG. 12 is an exemplary schematic wiring diagram for the thermostatic switch illustrated in FIGS. 1–11, in combination with a split-phase electrical motor.

Dimensions of certain of the parts as shown in the drawings have been modified for the purposes of clarity of illustration.

Similar reference characters indicate corresponding parts throughout the several views of the drawings.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, particularly FIGS. 8–10, an improved assembled thermostatic switch embodying my invention is shown at numeral 10. Switch 10 is of the type which is adapted for electrical series connection with both the main and start windings of a split-phase electrical motor to provide "complete total protection" for both the start and main windings separately, as well as both of them combined, against abnormal conditions which can cause overheating and burnout of the winding such as, for example, described in a copending application of James E. Shockroo and Walter H. Moksu, entitled, "Thermally Responsive Switches," Serial No. 841,237, filed September 21, 1959, and assigned to the assignee of the instant invention.

As best seen in FIG. 8, switch 10 comprises three separate subassemblies which conveniently may be provided in kit form, and which can be quickly detachably assembled into an operative switch, as will be clear from the ensuing description below. The three subassemblies of switch 10 comprise a base assembly unit generally referred to by numeral 20, and two heater assembly units generally referred to by numerals 100 and 200.

Referring now to FIGS. 1–3, base assembly unit 20 includes a housing or base member 22 formed of electrically insulating material, such as a moldable, phenolic resinous material or a ceramic material. Base 22 provides a pair of open-ended recesses 24 and 26, as defined by upstanding walls 28, 30 and 32, 34 of base 22. Wall 34 of base 22 is provided with an open-ended notch 36, which receives and co-operatively interfits with an L-shaped electrically conductive terminal 38. Base 22 also provides an open-ended slot 40 (as best seen in FIG. 2) which receives and co-operatively interfits with the short leg of terminal 38, which has an electrical contact 42 secured thereto, as by welding, as best seen in FIG. 2.

Unit 20 also provides a second electrical contact 44, which as best seen in FIGS 2 and 11, is electrically connected to and mounted, as by welding, on a leg 46 of an L-shaped terminal-forming member generally referred to by numeral 48. L-shaped terminal-forming member 48 includes a short leg 50 which projects upwardly into recess 24 substantially perpendicular to leg 46, as best seen in FIGS. 2 and 11. Leg 50 of electrically conductive terminal member 48 includes an upper surface 52 which preferably is coated with a layer of silver or the like to provide a good electrical contacting surface for a purpose to be described in greater detail below.

Base 22 provides an open-ended slot 54 which receives and interfits with leg 56 of a second terminal-forming member generally referred to by numeral 58. As best seen in FIGS. 2 and 11, leg 56 of terminal member 58 is electrically connected, as by welding, to contact 44 through leg 46 of terminal-forming member 48. As best seen in FIG. 11, terminal-forming member 58 includes an elongated portion 57 formed integrally with and extending substantially at right angles to leg 56, and also transversely of base 22. Formed integrally with portion 57, and extending substantially perpendicular thereto at the free end thereof, is a return-bent portion 59. Portion 59, like portion 50, includes a free end surface 60 (similar to surface 52) which is disposed within recess or cavity 26 provided by base 22, and which surface 60 is preferably coated with a layer of low-resistance electrically conductive material, such as silver.

Contacts 42 and 44 (both of which are disposed in recess 24) are aligned for respective mating engagement with a pair of spaced contacts 62 and 64, carried by and electrically connected to a snap-acting thermostatic plate member 66, as shown. Thermostatic member 66 comprises a dished, bimetallic snap-acting thermostatic disc of the type shown and described, for example, in the U.S. Spencer Patent No. 1,448,240 or in the U.S. Vaughan et al. Patent No. 2,317,831. The operation of this type of snap-acting thermal element is well known in the art.

Thermostatic element 66 is provided with a centrally located aperture within which there is received a portion of an adjusting screw 68. Thermostatic element 66 is loosely mounted on adjusting screw 68 between shoulders or abutments such as at 70 and at flanged end 72, all as described in the aforesaid patents.

As best seen in FIG. 1, thermostatic element 66 is guided for assembly into base 22, and once assembled therein, is prevented from rotating relative to the base through the co-operation of upstanding walls 74, 76 provided by base 22, and ear 78 of thermal element 66. Screw 68 is received in threaded engagement within a threaded open-ended aperture 80 provided in base 22, as best seen in FIG. 2. As thus mounted, relative rotation between the thermal element and housing is inhibited, but relative rotation between the disc 66 and the adjusting screw 68 is permitted. Thus, screw 68 may be rotated to adjust the operating temperature of thermostatic disc or element 66, without rotating the element itself. Adjusting screw 68 is provided with a notched portion 82, which opens into recess 26 provided by base 22, and is adapted for reception of a tool therein to effect rotation of screw 68 for calibration of the thermal element 66.

As best seen in FIG. 3, base 22 provides a plurality of open-ended apertures 84 in its lower wall to facilitate heat transfer to element 66, as will be described in greater detail below.

Referring now to FIGS. 4-6, there is shown a heater assembly unit generally referred to by numeral 100. Heater assembly unit 100 includes a cup-shaped cover member 102 formed of electrically insulating material, such as, for example, a moldable phenolic thermosetting resin or a ceramic material. Cover member 102 provides a recess 104 (as best seen in FIG. 5) which is defined by walls 106, 108 and 110, 112. The spacing between interior surfaces of walls 106, 108 and 110, 112 is slightly greater than the spacing respectively between the exterior surfaces of walls 32, 34 and 28, 30 of base assembly unit 20, so that the latter may snugly receive cover member 102 thereabout, as best seen in FIG. 10.

Heater assembly unit 100 includes a heater sub-assembly comprising terminals 114, 116 and an electrical resistance type heating element 120. Electrical resistance heater element 120 is preferably a luminous and radiant type heater, and is positioned in good or intimate heat-transfer relation to thermostatic element 66, when all of the parts of the switch are in the final assembled relation. In this condition, heater element 120 will be in thermal juxtaposition to the thermal element 66 and will provide heat thereto by direct conduction. Heater element 120, as is generally characteristic of such elements, is formed of high electrical resistance material and can generate substantial amounts of heat due to current flow therethrough.

The free ends 122, 124 of heater 120 are respectively electrically connected to and mounted on electrically conductive terminals 114 and 116, as by welding, as best seen in FIG. 6. Cover member 102 provides a pair of integrally formed upstanding cylindrical projections 126 and 128, as best seen in FIGS. 5 and 6. Each of terminals 114 and 116 are provided with a pair of integrally formed jaws 130, 130, which bite into and prevent unintended retraction of the terminal from its respective post when the terminal is pressed thereover to the position shown in FIG. 5. Cover member 102 provides an open-ended notch 113 which is adapted to receive and co-operatively interfit with an exteriorly extending portion of terminal 114. The heater 120 and terminals 114, 116 may be mass produced as a separate subassembly, and may be quickly and easily mounted into place on cover 102 to provide the heater assembly unit 100.

The looped portions of heater 120 extend substantially across the interior width of cover member 102, and are closely spaced from the interior surfaces of walls 110, 112 of the cover member whereby when heater assembly 100 is secured into final assembled relation with respect to assembly 20, the heater member 120 will be clamped between the outer edges of walls 28 and 30 of subassembly 20 and the cover member to provide a rigid support for the heater, as best seen in FIG. 11.

Terminal 116 is formed of electrically conductive spring material, and includes a bent portion 132 which is biased for movement in a direction away from heater member 120, as best seen in FIG. 11. The outer surface of spring arm 132 is preferably provided with a coating of a good electrically conductive material, such as silver or the like, to provide a good, low-resistance, electrically conductive connection to surface 52 of terminal 48. As best seen in FIG. 11, when units 20 and 100 are fixed together in final assembled relation, the lower surface of spring arm 132 will abut and resiliently press against surface 52 of leg 50 of terminal 48. In this assembled condition, spring arm 132 will be depressed against its bias (moving from the dashed to the solid line position shown in FIG. 11) and will provide a resilient spring pressure releasable low-resistance electrical connection between terminal 48 and terminal 116. This resilient spring pressure or squeeze type releasable electrical connection between terminals 116 and 48 is advantageously simple and low-cost, and does not require soldering or welding of parts for assembly of the switch. This advantageously obviates the dangers of upsetting or deleteriously affecting the calibration of the snap-acting element 66 during assembly which might be present if soldering or welding of parts were required. Another advantage of the snap-on terminal heater arrangement and spring-type electrical connection between parts is that no special tools or welding are required for assembly of the switch units.

Referring now to FIGS. 4, 5 and 10, the outer surface of cover member 102 provides a longitudinally extending groove 140, and a recessed detent surface portion 142, which is adapted to receive one leg 151 of a detent spring clip 150 (as shown in FIGS. 10 and 11).

Spring clip 150 includes a pair of legs 151, 153 which are spring biased for movement toward each other. Clip 150 is adapted to detachably secure subassembly units 100, 20 and 200, together into final assembled and operative relation to provide thermally responsive switch 10, as shown in FIG. 10. Each of legs 151, 153 includes a dimpled portion 152 adjacent their free ends, which mates and interfits with detent recess 142 to retain the clip in place about the assembly units as shown. The upper surface of clip 150, when the latter is in operative final assembled relation, as shown in FIG. 10, lies substantially flush with the upper surface of cover member 102.

Referring now to FIG. 7, there is shown another heater assembly unit generally referred to by numeral 200. Heater assembly unit 200 is substantially identical to heater assembly unit 100, with like parts being indicated by primed reference numerals in FIG. 7. Heater assembly unit 200 differs basically from heater assembly unit 100 in the provision of the heater element. Heater element 220 constitutes a different configuration and length of heater resistance wire than that of heater element 120, and consequently provides a different electrical resistance (assuming that heaters 120 and 220 are formed of the same wire diameter and material) than that of heater 120, as shown in FIG. 6.

Free ends 222 and 224 of heater 220 are electrically connected and mounted respectively on terminals 114' and 116', as described above for heater assembly 100. Cover 102' also provides a longitudinally extending or channel-like groove and detent portion, such as 140, 142 shown in FIG. 4, for reception of the other leg 153 of clip 150, as best seen in FIG. 10.

Spring arm 132' of heater assembly unit 200 abuts surface 60 of leg 59 of terminal 58 to provide a resilient electrical connection therebetween when assembly unit 200 is mounted on unit 20 as shown in FIGS. 10 and 11, which is similar to the electrical connection between surface 52 and spring arm 132 described above.

Covers 102 and 102' being identical, are advantageously interchangeable for units 100 and 200. Thus, a standard cover member 102 can be supplied, and units 100 and 200 can be provided by selection of the proper heater-terminal subassembly for mounting on projections 126 and 128 of the cover member.

Referring now to FIGS. 8 and 10, the units comprising the switch 10 are quickly and easily assembled by disposing unit 100 about unit 20 to close the recess 24 and by disposing heater assembly unit 200 about the other free end of base 22 of unit 20 to close recess 26, in the manner clearly shown in FIGS. 8 and 10. Thereafter, clip 150 is slidably disposed into grooves 140 and 140' respectively of units 100 and 200, until the detent portion 152 of each of the legs 151, 153 of the clip are received respectively within detent notches 142 and 142' respectively provided by units 100 and 200, to detachably connect the units in final assembled relation.

As best seen in FIG. 10, the assembly units 100, 20 and 200, when in final assembled relation dispose heaters 120 and 220 in intimate heat-transfer relation to thermally responsive element 66. Openings 84 in base 22 facilitate transfer of heat generated by heater 220 to the thermally responsive element 66. As shown, each of heaters 120 and 220 are disposed entirely to a respective side of the thermal element 66, and provide for good heat-transfer to and fast response of thermal element 66.

As best seen in FIG. 11, the upper surfaces of walls 28 and 30 of unit 20 which support heater 120, are of a height adequate to assure that snap-acting element 66, when the latter snaps to open the contacts, to the position shown in dashed lines in FIG. 2, will not engage heater 120 or cause an undesirable short circuit therebetween. Also as best seen in FIG. 10, cover members 102 and 102', when detachably secured to base 22, (by clip 150) cover and close off the open areas provided by notches 36, 113 and 113' to protect the interior of the switch against entry of dirt, debris, etc.

Although heaters 120 and 220 have been shown as serpentine in form, and formed of a round wire, it should be understood that the heating elements may have other cross sectional configurations, such as rectangular or polygonal, and may also be a strip, ribbon or the like. The terms "wire" and "wire-like" are used herein as characterizing each of these heater forms. The heating elements or units 120 and 220 may also comprise heaters deposited on insulating plates such as, for example, printed circuit, vacuum deposited, or plated type heater constructions, within the purview of my invention.

It should also be understood that the instant invention is also applicable to and useful for static-type thermally responsive switching devices, such as disclosed, for example, in a copending U.S. patent application of Charles D. Flanagan, entitled, "Temperature Sensitive Electrical Control Element," Serial No. 800,314, filed March 18, 1959, and assigned to the assignee of the instant invention.

The thermostatic switch 10, described above, is particularly suited for assembly by service or motor repair shops. Electric motors of different makes, although of similar ratings, are not exactly alike. For this reason, in the past each manufacturer's motor model has required a protector tailor made to match its particular thermal characteristics. This tailoring process had created a technical and also a time-consuming and economic problem for motor servicemen who wanted to apply a protector to a motor not originally equipped with one. Formerly, only motor or motor protector manufacturers having the necessary test equipment could tailor protectors to match motor characteristics. My invention now makes it possible for the service repair shops or small motor manufacturers to quickly and economically assemble tailored overhead inherent motor protectors for specific motors by determining the selection of the proper assembly units 20, 100 and 200 according to the thermal characteristics of the motor windings to be protected based on the size (and material) of the wire used in the motor windings from a kit provided for this purpose. Such a service or repair shop kit may, for example, include several base assemblies 20 (which base assemblies differ from each other in the rating and calibration of the thermal element 66) and a selection of several heater subassembly units 100 and 200 of different ratings (or different electrical resistance). With this kit, the service shop can now select the proper parts and assemble its own service shop inherent motor protector tailored to meet specific requirements.

It has been found that there is in general use, a limited number of sizes of wire and materials commonly used in start windings. It is now possible, according to my invention, to supply the service shop with tables designating the appropriate heater assembly unit (100), base assembly unit 20 (with the proper rated disc 62) and heater assembly 200 to be employed for a given motor having a main and a start winding formed of a particular wire size and material. The selection of the heater unit 100 is made on the basis of the wire size and material of the start winding to provide a predetermined size relationship therebetween. The selection of the base assembly unit 20 and heater unit 200 is made on the basis of the wire size and material of the motor main winding and also provides a predetermined size relationship between heater 220 and the main winding.

Thus, the motor repair shop serviceman, to assemble and provide a tailored motor protector for protection of a particular motor, need merely perform the following simple steps:

(1) Ascertain the size and material of the wire used in each of the motor windings to be protected;

(2) Select the proper base assembly 20 based on the material and size of the wire forming the main winding of the motor to be protected as prescribed by the table;

(3) Select the proper heater assembly unit 100 to provide a predetermined size relation between the heater and the start winding of the motor, as prescribed by the table;

(4) Select the proper heater assembly unit 200 to provide a predetermined size relation between the heater and the main winding of the motor, as prescribed by the table;

(5) Thereafter, the appropriately selected assembly units 100, 20 and 200 are assembled by disposing clip 150 thereabout to retain all of the parts in final operative assembled relation, as described above.

Selecting the base assembly units 20 and heater assembly units 100 and 200 on the basis of wire size of the motor windings to be protected, advantageously eliminates the necessity of carrying an overly large inventory of protector parts by the serviceman, and now uniquely permits tailoring of a motor protector for a specific motor without the necessity for employing expensive and complex test equipment as formerly required.

Referring now to the circuit diagram of FIG. 12, thermostatic switch 10 is schematically illustrated in an exemplary circuit with a motor 300 having an auxiliary start or phase winding 302 (indicated at SW) and a main or running winding 304 (indicated at MW). One power supply line $L_1$, is connected by a conductor 306 to terminal 38. The other side of the supply line $L_2$, is connected by a conductor 308 to the common connection between the start winding 302 and main winding 304. The other end of the start winding 302 is connected by a conductor 310 to a conventional start winding disconnect switch, indicated schematically by reference numeral 312, and then by conductor 314 to terminal 114 of heater assembly unit 100. The other end of main or run winding 304 is electrically connected by conductor 316 to terminal 114' of heater assembly unit 200.

As thus connected, it will be observed that the current in the starting winding flows from $L_2$, one side of the power supply line, through conductor 308, start winding 302, conductor 310, switch 312, conductor 314, terminal 114, through starting winding heater 120, to terminal 116, to spring arm 132, to terminal member 48 (through the electrical connection between spring arm 132 and surface 52) to stationary contact 44, to contact 64, through snap-acting thermal element 66 to contact 62, then to contact 42, then through terminal 38 to conductor 306 to $L_1$, the other side of the power source.

Current through the main or run winding 304 flows from $L_2$, through conductor 308, through the main winding 304, conductor 316, to terminal 114', through main winding heater 220 (of heater unit 200), to terminal 116' to spring arm 132', to surface 60 of terminal member 58, through member 58 to contact 44, to contact 64, through thermally responsive snap-acting element 66, to contact 62, to contact 42, then through terminal 38 to conductor 306 to $L_1$, the other side of the power source.

From the above, it will be observed that heater 120 is electrically connected in series with the start winding and heater 220 is electrically connected in series with the main winding 304. The operation of the thermostatic device 10, in the exemplary circuit of FIG. 12, as described above is as follows:

Under normal operating conditions of the motor 300, the heat generated by the current passing through the thermally responsive element 66 and heaters 120 and 220, will not be sufficient to raise the temperature of the thermally responsive element 66 to the point where it snaps (if it is of the snap-acting type) or moves a distance (if it is of the creep-acting type) to open the electrical contacts 42, 62 and 44, 64 to de-energize the motor. If, however, the motor becomes subject to one or more abnormal conditions, such as those described in the copending application referred to above, the heavy starting and/or run winding currents will influence their respective heaters 120 and 220, as well as the thermal element 66, to cause the latter to move to open the circuits of both windings, thus protecting the motor windings from overheating. One example of such an abnormal condition is where the motor has been running and the start winding is not in the circuit and then the motor becomes overloaded, or there is a locked rotor condition with the main winding only in the circuit (which may have resulted from open circuit switch 312 failure or open circuit in the reversing switch failure) the excess current in the run winding 304 will raise the temperature of the heater 220 and (according to the calibration of the thermally responsive element 66), the effect of heater 220 on the thermal element 66 will, after a time, be sufficient to cause the latter to move to open the circuit before the windings are damaged.

It should be understood that the thermally responsive switch of the instant invention is susceptible to diverse applications in motor protective circuits other than that illustrated by way of example in FIG. 12. For example, the switch of the instant invention could be employed with multispeed, dual voltage, or other electric motors or energy-translating devices having one, two or more than two windings.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A thermally responsive electrical switch for protection of a motor having at least two windings; said switch comprising first, second and third assembly units; said first unit including a base formed of electrically insulating material; said first unit including a pair of electrical contacts; a thermally responsive snap-acting element carried by said base and operatively associated with said contacts for actuation thereof to control an electrical circuit for said winding at predetermined conditions; said second and third units each including a cover member formed of electrically insulated material; each of said cover members carrying an electrical heater formed of wire-like material having a substantial electrical resistance; means detachably securing said first, second and third units together with said first unit intermediate said second and third units; spring means resiliently electrically connecting each of said heaters with one of said contacts and each of said heaters being disposed in heat-transfer relation to said thermally responsive snap-acting element, when said first, second and third units are detachably secured together; one of said heaters being electrically connectable in series with one of said windings and the other of said heaters being electrically connectable in series with the other of said windings; each of said heaters having a wire size selected according to the size of the wire used in the respective motor winding to which said heater unit is electrically connectable to provide a predetermined size relationship therebetween.

2. A thermally responsive responsive electrical switch comprising first, second and third assembly units; said first unit including a base formed of electrically insulating material and mounting a first pair of electrical contacts; thermally responsive snap-acting means carried by said base and mounting a second pair of spaced electrical contacts positioned for movement into and out of engagement with said first pair of contacts at predetermined conditions; said second and third units each including a cover member, each carrying an electrical heater formed of wire-like material having a substantial electrical resistance; means securing said first, second and third units together with said first unit intermediate said second and third units; a spring member disposed intermediate said first unit and each of said second and third units resiliently electrically connecting each of said heaters with a respective one of said first pair of contacts and each of said heaters being disposed in heat-transfer relation to said thermally responsive snap-acting means, when said first, second and third units are secured together.

3. The switch as set forth in claim 2 and wherein said first, second and third units are detachably secured together by spring clip means and each of said spring members being carried by a respective one of said second and third units.

References Cited by the Examiner
UNITED STATES PATENTS

| | | | |
|---|---|---|---|
| 2,414,531 | 1/47 | Johns | 200—122 |
| 2,496,732 | 2/50 | Lyman | 339—252 |
| 2,840,666 | 6/58 | Greenhut | 200—122 |
| 2,891,124 | 6/59 | Vaughn | 200—122 |
| 3,004,203 | 10/61 | Epstein | 318—221 |
| 3,023,350 | 2/62 | Broadley et al. | 318—221 |

BERNARD A. GILHEANY, *Primary Examiner.*
ROBERT K. SCHAEFER, *Examiner.*